United States Patent [19]

Frank

[11] Patent Number: 4,995,258

[45] Date of Patent: Feb. 26, 1991

[54] METHOD FOR DETERMINING AIR MASS IN A CRANKCASE SCAVENGED TWO-STROKE ENGINE

[75] Inventor: Richard M. Frank, Beverly Hills, Mich.

[73] Assignee: General Motors Corporation, Detroit, Mich.

[21] Appl. No.: 514,997

[22] Filed: Apr. 26, 1990

[51] Int. Cl.[5] .......... G01M 15/00

[52] U.S. Cl. .......... 73/118.2; 123/478

[58] Field of Search .......... 73/118.2, 117.3; 123/65 R, 478; 364/431.05

[56] References Cited

U.S. PATENT DOCUMENTS

| | | | |
|---|---|---|---|
| 4,402,294 | 9/1983 | McHugh et al. | 123/480 |
| 4,446,523 | 5/1984 | Reinke | 364/431.05 |
| 4,461,260 | 7/1984 | Nonaka et al. | 123/478 |
| 4,664,090 | 5/1987 | Kabasin | 123/494 |
| 4,750,352 | 6/1988 | Kolhoff | 73/117.3 |
| 4,788,854 | 12/1988 | Javaherian | 73/117.3 |

FOREIGN PATENT DOCUMENTS

| | | | |
|---|---|---|---|
| 124017 | 9/1980 | Japan | 73/118.2 |

*Primary Examiner*—Jerry W. Myracle

*Attorney, Agent, or Firm*—Howard N. Conkey

[57] ABSTRACT

A method is described for determining the cylinder mass of air available for combustion in a crankcase scavenged, two-cycle engine, based upon the Ideal Gas Law relationship and indications of pressure, volume, and temperature of air in the crankcase chamber, at predetermined points in the engine operating cycle. This is achieved by first determining the mass of air trapped and compressed in a crankcase chamber, and thereafter, determining the residual air mass remaining in the crankcase after the transfer of air to the associated combustion chamber. Then, the actual air mass transferred to the combustion chamber is determined as a function of the difference between the trapped and residual air masses. Engine trapping efficiency can be used to correct for air leakage from the combustion chamber prior to cylinder exhaust port closure. The volume of the air within the crankcase chamber is derived as a function of engine cycle position, with crankcase air temperature being derived as a function of intake air temperature. Air pressure in the crankcase is monitored with a pressure transducer.

14 Claims, 2 Drawing Sheets

FUEL SIGNAL
SPARK
COMPUTER
MAP
MAT
IGNITION
SPARK ADVANCE
TDC
ANGLE
CCP
10 12 14 16 18 20 22 24 26 28 30 32 34 36 38 40 42 44 46 48 50 52 54 56 58

METHOD FOR DETERMINING AIR MASS IN A CRANKCASE SCAVENGED TWO-STROKE ENGINE

BACKGROUND OF THE INVENTION

This invention relates to the determination of engine mass air-flow and more particularly to a method for deriving an indication of the mass of air available for combustion within a cylinder of a crankcase scavenged two-stroke engine.

In a crankcase scavenged two-stroke engine, each individual cylinder has its own separate crankcase chamber. During portions of the engine operating cycle, air is inducted into each crankcase chamber, compressed while the crankcase chamber is decreasing in volume, and then transferred to the associated cylinder combustion chamber, where it is mixed with fuel for ignition.

In order to effectively control the emission and performance characteristics of such an engine, it is necessary to know the mass of air available at the time of combustion within each cylinder. Once this information is known, the air-fuel ratio can be adjusted accordingly to achieved the desired emission and performance objectives.

Conventional hot wire or hot film sensors can be used to measure the total air-flow per cycle, in a two-stroke engine, however, these sensors tend to be relatively expensive, fragile, and easily contaminated by dirt in the air flow. Alternatives have been proposed for eliminating conventional mass air-flow sensors in crankcase scavenged, two-stroke engines, and for estimating the individual mass air-flow per cylinder. These techniques are described in U.S application Ser. No. 377,383, filed July 10, 1989 now U.S. Pat. No. 4,920,790, and U.S. application Ser. No. 409,377, filed Sept. 19, 1989, now U.S. Pat. No. 4,920,789 which are copending with the present application and assigned to the same assignee. In each case, the mass of air trapped within a crankcase chamber is determined as a function of pressure, volume, and temperature of the air during crankcase compression, prior to the transfer of air to a cylinder combustion chamber. Each technique requires correction factors to account for incomplete transference of air between crankcase and combustion chambers, and to account for leakage of the transferred air out of the combustion chamber prior to cylinder exhaust port closure.

SUMMARY OF THE INVENTION

The present invention is directed toward determining the mass of air available for combustion in a cylinder of a crankcase scavenged, two-stroke engine, based upon derived indications of the pressure, volume, and temperature of air within the associated crankcase chamber, without requiring a correction for the incomplete transfer of air between the crankcase and combustion chambers. This is accomplished by first determining the mass of air $M_T$ trapped while undergoing compression in a crankcase chamber, and then determining the residual air mass $M_R$ remaining in the crankcase, just after the transfer of air to the combustion chamber. The mass of air actually transferred to the combustion chamber is then determined directly as a function of the difference $(M_T-M_R)$ between the trapped and residual crankcase air masses. Accordingly, a correction to account for incomplete air transference between crankcase and combustion chambers is not required. Thus, an important feature of the present invention is that combustion mass air can be accurately determined using only a single correction to account for that amount of air which leaks from the cylinder combustion chamber prior to exhaust port closure.

In accordance with the principle of the invention, air mass within a crankcase, both during crankcase compression and after the transfer of air to the associated combustion chamber, is preferably determined according to the Ideal Gas Law, $M=PV/RT$, where M, P, V, T, and R, are respectively the mass, pressure, volume, temperature, and gas constant for air within the crankcase, determined at the appropriate times during the engine operating cycle. Consequently, crankcase chamber mass air is computed using a relatively simple algebraic relationship requiring low computational overhead in a conventional microprocessor based engine control system.

Further, in the preferred embodiments of the present invention the mass of air transferred to a combustion chamber is equated to the expression $\alpha+\beta(M_T-M_R)$, a predetermined linear function of the difference between the trapped and residual crankcase air masses. Accordingly, improved accuracy is achieved when predicting the transferred air mass because values for the constants $\alpha$ and $\beta$ are selected to correspond to a best fit line, which relates measured and calculated air flow data obtained under different engine operating conditions.

Additionally, the present invention provides for deriving a required indication of crankcase air temperature as a function of the temperature of air inducted into the engine. This is accomplished by either assuming that the crankcase air temperature is equal to the intake temperature, or a more accurate functional relationship between the crankcase and intake air temperatures can be used, by assuming that the expansion and compression of crankcase air behaves isentropically. This is a significant feature since engine temperature sensors typically have long lag times relative to engine cycle time. As a result, intake air temperature, which is generally slowly varying, can be measured more accurately than crankcase air temperature, which varies rapidly over an engine cycle. Also, means for measuring intake air temperature already exists in most typical engine control systems. Consequently, by deriving crankcase air temperature as a function of air intake temperature, the invention generally does not require an additional crankcase temperature sensor to function properly.

According to another aspect of the invention, crankcase volume is derived as a predetermined function of the engine cycle position. Preferably, the volume within a crankcase chamber at a given time is defined by the angular rotation of the engine crankshaft as measured by means already existing in a typical engine control system.

As contemplated by another aspect of the invention, the pressure of air within a crankcase chamber is preferably derived from a conventional pressure sensor, disposed within the crankcase chamber. As a result, the invention requires only the addition of a relatively inexpensive pressure transducer to a conventional computer engine control system to enable the determination of the cylinder mass air flow.

According to still another aspect of the invention, the value for the air mass transferred from a crankcase chamber to its associated cylinder is corrected to account for the amount of air which leaks out of the cylinder prior to closure of the exhaust port. Thus, an accurate estimate for the mass air available for cylinder combustion is achieved.

These and other aspects and advantages of the invention may be best understood by reference to the following detailed description of the preferred embodiments when considered in conjunction with the accompanying drawings.

DETAILED DESCRIPTION OF THE PREFERRED EMBODIMENTS

Figure 1:
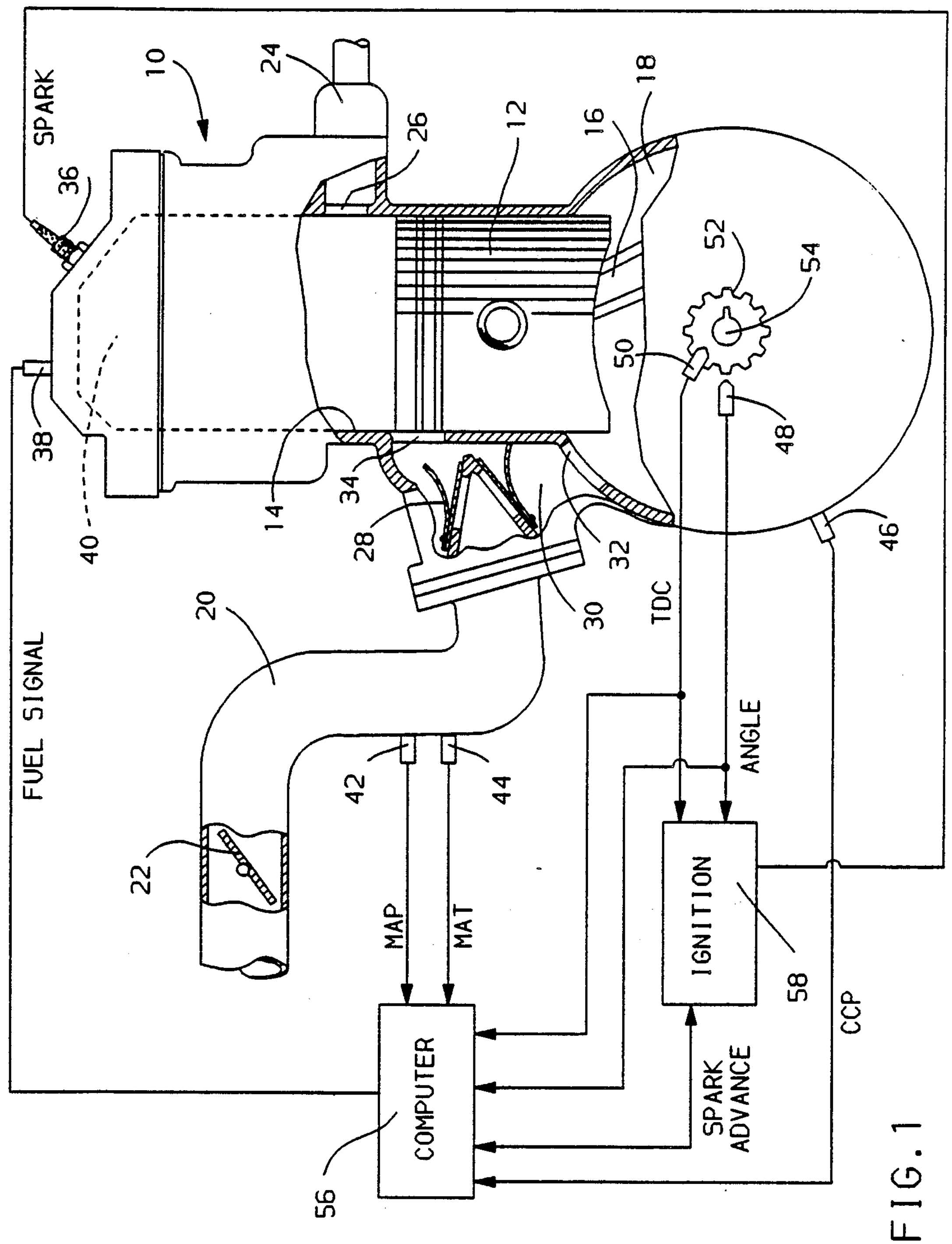
FIG. 1 is a schematic diagram of one cylinder of a crankcase scavenged two-stroke engine and control system therefore, that includes the system for estimating the mass of air available for combustion in accordance with the principles of this invention.

Referring to FIG. 1, there is shown schematically a crankcase scavenged two-stroke engine, generally designated as 10, with a portion of the engine exterior cut away, exposing cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 with a throttle 22, and an exhaust manifold 24. Cylinder 14 communicates with exhaust manifold 24 through exhaust port 24 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

Associated with engine 10 are various conventional sensors known to the art, which provide typical signals related to engine control. Located within the air intake manifold 20 are a pressure sensor 42 for measuring intake manifold absolute pressure (MAP), and a temperature sensor 44 for measuring manifold air temperature (MAT). Electromagnetic sensors 48 and 50 provide pulsed signals indicative of crankshaft rotational position (ANGLE) and the top dead center position for cylinder 14 (TDC), by respectively sensing movement of the teeth on ring gear 52 and disk 54, which are attached to the end of the engine crankshaft. The crankshaft rotational angle $\theta$ from top dead center in cylinder 14 can be obtained by counting the number of pulses occurring in the ANGLE signal after the TDC pulse, then multiplying that count by the angular spacing of teeth on ring gear 52. The engine speed in revolutions per minute (RPM) may also be obtained by counting the number of TDC pulses which occur in a specified period of time, then multiplying by the appropriate conversion constant.

Computer 56 is a conventional digital computer used by those skilled in the art for engine control, and includes the standard elements of a central processing unit, random access memory (RAM), read only memory (ROM), analog-to-digital converters, input/output circuitry, and clock circuitry. Signals from the previously mentioned sensors flow over the indicated paths and serve as inputs to computer 56. Using these inputs, computer 56 performs the appropriate conventional computations to provide an output FUEL SIGNAL to fuel injector 38 and an output SPARK ADVANCE signal to ignition system 58.

Ignition system 58 generates a high voltage SPARK signal, which is applied to spark plug 36 at the appropriate time, as determined by the SPARK ADVANCE signal supplied by computer 56 and the position of the engine crankshaft given by the ANGLE and TDC input signals. Ignition system 58 may include a standard distributor or take any other appropriate form in the prior art.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40, above piston 12, is mixed with fuel from injector 38 and compressed until spark plug 36 ignites the mixture near the top of the stroke. As combustion is initiated, piston 12 begins the downstroke, decreasing the volume of crankcase chamber 18 and the air inducted therein, due to closure of reed valve 28. Toward the end of the downstroke, piston 12 uncovers exhaust port 26 to release the combusted fuel, followed by the uncovering of inlet port 34, enabling compressed air within the crankcase chamber 18 to flow through the air transfer passage 30 into cylinder 14. The cycle begins anew when piston 12 reaches the lowest point in cylinder 14.

In order to effectively control two-stroke engine emission and performance characteristics, it is necessary to know the mass of air available in cylinder 14 at the time of combustion. Once this information is known, the air-fuel ratio can be adjusted to achieve the emission and performance objectives.

Conventional hot wire or hot film sensors can be used to measure the total mass air-flow per cycle in a two-stroke engine; however, these sensors tend to be relatively expensive, fragile, and easily contaminated. Alternatives have been proposed for eliminating conventional mass air-flow sensors in crankcase scavenged, two-stroke engines, and for providing estimates of the individual mass air-flow per cylinder. These techniques are described in U.S. application Ser. No. 377,383, filed July 10, 1989, and U.S. application Ser. No. 409,377, filed Sept. 19, 1989, which are copending with the present application and assigned to the same assignee. In each of these prior applications, the mass of air trapped within a crankcase chamber is determined as a function of pressure, volume, and temperature of the air during crankcase compression, prior to transfer of air to a cylinder combustion chamber. Each of these techniques requires the estimation of correction factors to account for incomplete transference of air between crankcase and combustion chambers, and to account for leakage of the transferred air out of the combustion chamber prior to closure of the cylinder exhaust port.

The present invention is directed toward determining the mass or air available for combustion in a cylinder of a crankcase scavenged, two-stroke engine, based upon derived indications of the pressure, volume, and temperature of air within the associated crankcase chamber, but without requiring the correction associated with the incómplete transfer of air between the crankcase and combustion chambers. This is accomplished by first determining the mass of air trapped and undergoing compression in a crankcase chamber, and then determining the residual air mass remaining in the crankcase, just after air is transferred to the associated cylinder through the opened intake port. The mass air actually transferred to the combustion chamber is then determined as a function of the difference between the trapped and residual crankcase air masses. Accordingly, the present invention goes beyond the techniques disclosed in the above mentioned copending application, in that, an accurate method for the determination of cylinder mass air is provided, without requiring a correction factor to account for incomplete air transference between the crankcase and combustion chambers.

The mathematical equations, upon which the invention is based, will now be derived. Since the pressure of the air in crankcase chamber 18 never exceeds the critical pressure, it can be assumed that the crankcase air mass at any instant of time is given by the Ideal Gas Law:

$$M=PV/RT, \quad (1)$$

(where M, P, V, T, and R are respectively, the mass, pressure, volume, temperature, and gas constant of the crankcase air at a specified time during the engine operating cycle.

A conventional temperature sensor could be used to measure crankcase air temperature T, however, engine temperature sensors typically have a long response time compared to the engine cycle time, making it difficult to obtain accurate measurements for crankcase temperature. Thus, an alternative to the actual measurement of crankcase air temperature is desirable.

As a first approximation, it can be assumed that the crankcase air temperature is equal to the temperature $T_{IN}$ of the air inducted into the engine from the intake manifold. When this approximation is applied to equation (1), an estimate for crankcase air mass is given by $$M=PV/RT_{IN} \quad (2)$$

which does not require knowledge of the crankcase air temperature.

A more accurate estimate for crankcase air temperature is obtained by recognizing that the compression process is relatively fast compared to the rate of heat transfer. Consequently, the net heat transfer out of crankcase chamber 18 is negligible, and the compression and expansion of air in the crankcase can be considered substantially isentropic.

Accordingly, the temperature of air in the crankcase can be approximated by $$T = T_{IN}(P/P_{IN})^{\frac{\gamma-1}{\gamma}} \quad (3)$$

where $P_{IN}$ is the pressure of air in intake manifold 20, and $\gamma$ represents the ratio of the specific heat of air at constant pressure to the specific heat at constant volume For air, $\gamma$ is approximately 1.4. Equation (3) is computational cumbersome due to presence of the fractional exponent, and can be further simplified, without introducing significant error, by the linear curve $$T=T_{IN}[0.732+0.268\,(P/P_{IN})], \quad (4)$$

(b 4)

(which represents a best fit of equation (3) for a range in the pressure ratio ($P/P_{IN}$) from 0.8 to 1.3.

Substituting the expression for T from equation (4) into equation (1) gives $$M=PV/\{R\,T_{IN}[0.732+0.268(P/_{IN})]\}, \quad (5)$$

for the crankcase air mass at any instant of time during the engine operating cycle. Equation (5) eliminates the need for a crankcase temperature sensor and is more accurate than equation (2) in estimating M; however, knowledge of both the intake air temperature and pressure is required.

The mass of air $M_T$ trapped and compressed in crankcase 18 can be determined by evaluating either of equations (2) or (5), at a time during engine rotation when $\theta=\theta_T$, which occurs after the closure of reed valve 28, and after piston 12 passes through top dead center, but prior to the opening of inlet port 34. Likewise, the mass of residual air $M_R$ remaining in the crankcase, after the transport of air to cylinder 14 is substantially completed, can be determined by evaluating either of equations (2) or (5), at an engine rotation of $\theta=\theta_R$, which occurs near the closing of inlet port 34, but prior to the flow of any substantial amount of new air into the crankcase through reed valve 28.

In terms of the trapped and residual air masses described above, an estimate for the air mass M, transferred to combustion chamber 40 from crankcase chamber 18, is given by $$M=M_T-M_R. \quad (6)$$

However, it has been found that equation (6) tends to slightly over predict engine air flow at low flow rates, apparently due to heat transfer from the crankcase, which lowers crankcase air density at the lower flow rates. This discrepancy can be minimized by use of the linear equation $$M=\alpha+\beta(M_T-M_R) \quad (7)$$

to obtain a best fit between actual measured air flow data and predicted air flow based upon the Ideal Gas Law expression of either equation (2) or (5). Linear regression analysis is used to determine the best fit values for $\alpha$ and $\beta$ based on measured and predicted air flow data for a number of different engine speed and load conditions.

In order to perform the computations required to estimate air mass M according to either of equations (2) or (5), and equation (7), computer 56 must be provided with the proper input signals from engine sensors, from which the required information can be derived. In the preferred embodiments of the present invention, an indication of crankcase pressure is provided by a pressure transducer 46, which is disposed within crankcase chamber 18 and develops a signal CCP for input to computer 56. Pressure sensor 46 may be any type of known pressure transducer which is capable of sensing the change in air pressure within crankcase chamber 18.

Manifold temperature sensor 44 provides a MAT signal indicative of air intake temperature, from which computer 56 can derive a value for $T_{IN}$ as required by equation (2) or by equation (5), if a more accurate estimate for crankcase air temperature is desired. Likewise, manifold pressure sensor 42 provides a MAP signal, which indicates the manifold air pressure, from which computer 56 can derive a value for $P_{IN}$ as required by equation (5).

Values for the crankcase volume V are required at engine rotational angles $\theta_T$ and $\theta_R$, for computing the masses $M_T$ and $M_R$ respectively, according to either equation (2) or equation (5). The volumes corresponding to the rotations $\theta_T$ and $\theta_R$ are known based upon the physical design of engine 10, and are stored as a lookup table in memory as a function of $\theta_T$ and $\theta_R$. As described previously, computer 56 derives the angular rotation $\theta$ of the engine crankshaft from the ANGLE and TDC signals provided by sensors 48 and 50, and continuously updates a stored value for ↓ in computer 56.

The mass M found by using the Ideal Gas Law as modified by either equation (2) or (5), and equation (6), represents the mass of air, per cylinder, per cycle flowing into the engine. In order to convert M into the mass of air per cylinder available for combustion, the engine trapping efficiency must be known. The mass of air M' available for cylinder combustion is given by the expression $$M' = M\,\eta_T, \tag{8}$$

where $\eta_T$ represents the engine trapping efficiency, which is the percentage of the mass of air flowing into a cylinder that is actually captured in the combustion chamber, after closure of the cylinder inlet and exhausts ports. The engine trapping efficiency is known to vary with engine speed and load. Conventionally, an engine dynamometer is used to measure trapping efficiency as a function of estimated air flow M, which is related to engine loading, and engine speed in RPM. The measured trapping efficiency values are normally stored as a lookup table in memory as a function of M and RPM.

The present invention was applied to a 3 cylinder 1.2 liter, two-stroke engine. The cylinder intake port of this engine opened at $\theta=120°$ after top dead center (ATDC), and closed at $\theta=240°$ ATDC. For this particular engine, the best correlation between measured and estimated air flow occurred when the masses $M_T$ and $M_R$ were computed at the engine rotational angles of $\theta_T=65°$ ATDC and $\theta_R=255°$ ATDC, respectively.

In one embodiment of the present invention, crankcase temperature was assumed to equal the intake air temperature $T_{IN}$, and the crankcase air masses $M_T$ and $M_R$ were computed according to the Ideal Gas Law as modified in equation (2). For this embodiment, the best fit of measured and estimated air flow data was obtained by setting $\alpha=-0.291$ and $\beta=0.840$ in equation (7) for M in grams/cylinder/cycle.

In another embodiment of the present invention, crankcase temperature was estimated by equation (4), and the crankcase air masses $M_T$ and $M_R$ were computed according to the Ideal Gas Law as modified in equation (5). For this embodiment, the best fit of equation (7) to measured and estimated air flow data was obtained using the values of $\alpha=0.0571$ and $\beta=1.117$.

It should be recognized that the optimum values for the above mentioned parameters are engine configuration specific, and different designs will require individual calibration on a dynamometer to determine the optimum angles $\theta_T$ and $\theta_R$, and correlation coefficients $\alpha$ and $\beta$.

Figure 2:
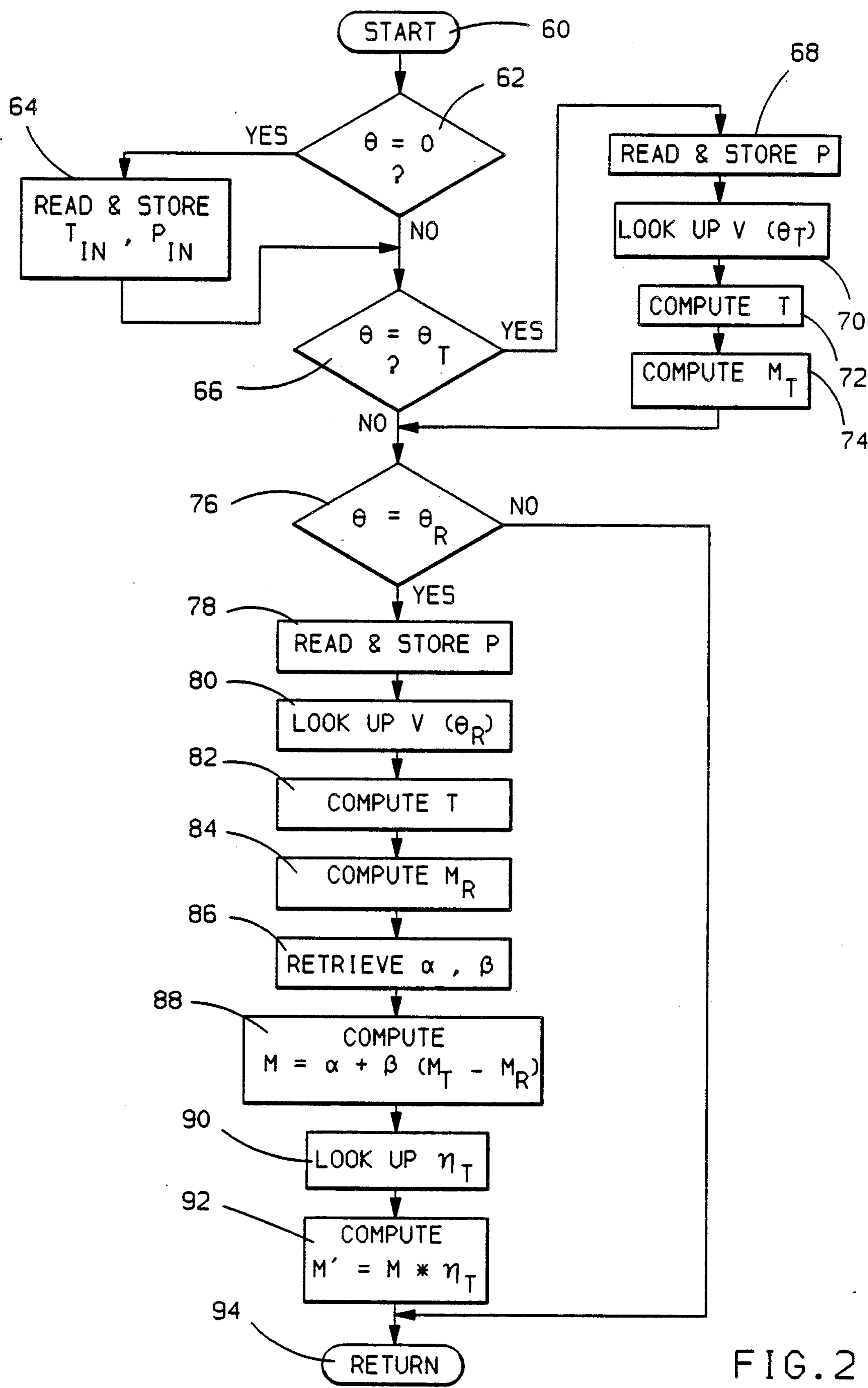
FIG. 2 is a flow diagram representing instructions in the routine executed by the computer in FIG. 1, when determining the mass of air available for combustion in accordance with the principles of this invention.

Referring now to FIG. 2, there is shown a simplified flow diagram illustrating a routine executed by computer 56 in estimating the cylinder mass air available for combustion, for embodiments of the present invention. After engine startup, all counters, flags, registers, and timers within computer 56 are initialized, and system initial values stored in ROM are entered into ROM designated memory locations in the RAM. After this preliminary initialization, computer 56 continuously executes a looped main engine control program. The routine illustrated in FIG. 2 is included as part of the main control program and is executed as computer 56 performs its control functions.

The routine is entered at point 60, and proceeds to decision step 62, where the currently stored value for crankshaft rotational angle $\theta$ is compared to 0°, to determine if the engine is at top dead center. If the engine is at the TDC position, the routine executes step 64, otherwise the routine proceeds to decision step 66.

At step 64, computer 56 reads and stores values for the intake air temperature $T_{IN}$ and pressure $P_{IN}$, by sampling input signals MAT and MAP from the respective manifold temperature and pressure sensors 44 and 42. As an alternative to the manifold pressure sensor 44, the pressure $P_{IN}$ can be estimated by sampling signal CCP from crankcase pressure sensor 46. When the engine is at TDC, the crankcase pressure signal CCP approximately represents the pressure in the intake manifold 20, because reed valve 28 has not yet closed and piston 12 is not yet compressing air in crankcase 18. After completing step 64, the routine proceeds to decision step 66.

At step 66, the current value for the crankshaft rotational angle $\theta$ is compared to $\theta_T$, to determine whether the crankshaft has reached the proper rotation for the calculation of the trapped crankcase air mass $M_T$. If $\theta=\theta_T$, the routine executes steps 68 to 74, otherwise, the routine proceeds to decision step 76.

If step 68 is executed, computer 56 reads and stores the crankcase air pressure associated with the rotational angle $\theta_T$, by sampling the signal CCP provided by crankcase pressure sensor 46.

Next at step 70, the value for the crankcase volume $V(\theta_T)$, associated with the rotational angle $\theta_T$, is looked up in a table stored in memory. The routine then proceeds to step 72.

At step 72, a value for crankcase temperature is computed. In the embodiment of the invention where crankcase temperature is assumed to be equal to the intake air temperature, T is merely set equal to $T_{IN}$. For the embodiment where crankcase temperature is not assumed to equal $T_{IN}$, the temperature T is computed according to equation (h4) using values of $T_{IN}$, $P_{IN}$, and P obtained at steps 64 and 68.

After completing step 72, the routine proceeds to step 74 where an estimate for the crankcase trapped air mass $M_T$ is computed by substituting the values of P, V, and T, found at steps 68 to 72, into the Ideal Gas Law equation (2). Although the preferred embodiments of the present invention use the Ideal Gas Law for determining $M_T$, the invention is not limited to use of that function alone. For example, more accuracy may be obtained by using equation (2) to compute the trapped crankcase air mass at several rotational positions during crankcase compression, and then averaging these values to obtain a final estimate for $M_T$. Alternatively, the trapped crankcase air mass can also be determined by integrating crankcase pressure with respect to the decreasing volume during crankcase compression, as set forth in the previously mentioned copending U.S applications having Ser. Nos. 377,383 and 409,377. After computing and storing the value for $M_T$, the routine proceeds to decision step 76.

At decision step 76, the current value for the crankshaft rotational angle $\theta$ is compared to $\theta_R$, to determine whether the crankshaft has reached the proper rotation for the calculation of the residual crankcase air mass $M_R$. If $\theta=\theta_R$, the routine proceeds to step 78, otherwise, the routine exits at step 94, and returns to the looped main engine control program.

If step 78 is executed, computer 56 reads and stores the crankcase air pressure associated with the rotational angle $\theta_R$, by sampling the signal CCP provided by crankcase pressure sensor 46.

Next at step 80, the value for the crankcase volume $V(\theta_R)$, associated with the rotational angle $\theta_R$, is looked up in a table stored in memory. The routine then proceeds to step 82.

At step 72, a value for crankcase temperature is computed. In the embodiment of the invention where crankcase temperature is assumed to equal the intake air temperature, T is merely set equal to $T_{IN}$. For the embodiment where crankcase temperature is not assumed to equal $T_{IN}$, the temperature T is computed according to equation (4), using values of $T_{IN}$, $P_{IN}$, and P obtained at steps 64 and 78.

After completing step 82, the routine proceeds to step 84 where an estimate for the residual crankcase air mass $M_R$ is computed by substituting the values of P, V, and T, found at steps 78 to 82, into the Ideal Gas Law equation (2). As previously stated, the preferred embodiments of the present invention use a single application of the Ideal Gas Law when determining crankcase air mass; however, the invention is not limited to use of that function alone. Other functions based on crankcase pressure, volume, and temperature may be used; for example, a more accurate estimate for $M_R$ may be obtained by averaging the results obtained from successive application of the Ideal Gas Law at a number of rotational angles occurring near closure of intake port 34, but prior to the flow of any substantial amount of new air into crankcase 18 through reed value 28. After computing and storing the value for $M_R$, the routine proceeds to step decision step 86.

At step 86, values for $\alpha$ and $\beta$, which are to be used in the following step, are retrieved from memory. For the particular engine to which the present invention was applied, $\alpha = =0.291$ and $\beta=0.840$, for the embodiment where crankcase air temperature is assumed to equal $T_{IN}$. For the embodiment where crankcase temperature is assumed to vary as in equation (4), $\alpha=0.0571$ and $\beta=1.117$.

Next at step 88, the mass of air M transferred from crankcase 18 to combustion chamber is computed based equation (7), as a function of the difference between the air masses $M_T$, found at step 74, and $M_R$, found in the previous step 84.

Following step 88, the trapping efficiency of the engine is looked up in a table stored in memory, as a function of the engine speed in RPM and the value of M found in step 88.

At step 92, the final cylinder air mass M', which is available for combustion, is computed using equation (8) with the values of M and $\eta_T$ found at steps 88 and 90. This value for M' is stored in memory and updated each engine cycle, for use in adjusting engine control parameters during the execution of the looped main control program. After step 92 is executed, the routine is exited at step 94.

The foregoing description of preferred embodiments of the invention is for the purpose of illustrating the invention, and is not to be considered as limiting or restricting the invention, since many modifications may be made by the exercise of skill in the art without departing from the scope of the invention. In particular, it should be recognized that the invention is equally applicable to either air or fuel based two-stroke engine control systems, where either fuel delivery or engine intake air is respectively regulated based upon the estimated cylinder mass air available for combustion.

The embodiments of the invention in which an exclusive property or privilege is claimed are defined as follows:

1. In a crankcase scavenged two-stroke engine characterized by an operating cycle including portions during which air is inducted into a crankcase chamber, is thereafter trapped and compressed within the shrinking volume of the crankcase chamber, and is then transferred to a combustion chamber; a method for determining the mass of air transferred to the combustion chamber during the engine cycle, comprising the steps of:

deriving indications of the pressure P, volume V, and temperature T, of air within the crankcase chamber during the engine operating cycle;

determining the mass of air $M_T$ trapped in the crankcase chamber from indicated values of pressure P, volume V, and temperature T derived during that portion of the operating cycle when air is trapped and compressed within the crankcase;

determining the residual mass of air $M_R$ remaining in the crankcase chamber from indicated values of pressure P, volume V, and temperature T derived during that portion of the operating cycle after the transfer of air to the combustion chamber is substantially completed; and estimating the mass of air M transferred to the combustion by chamber as a function of the difference between the mass of air $M_T$ trapped within the crankcase chamber and the mass of air $M_R$ remaining within the crankcase chamber.

2. The method in claim 1, wherein the mass of air $M_T$ trapped in the crankcase is determined in accordance with the Ideal Gas Law, such that $M_T=PV/RT$, where R is the gas constant for air.

3. The method in claim 1, wherein the mass of air $M_R$ remaining in the crankcase is determined in accordance with the Ideal Gas Law, such that $M_R=PV/RT$, where R is the gas constant for air.

4. The method in claim 1, wherein the mass of air M transferred to the combustion chamber is determined in accordance with the expression $M=\alpha+\beta(M_T-M_R)$, where $\alpha$ and $\beta$ are predetermined constants.

5. The method in claim 1, wherein the crankcase air temperature T is derived as a function of the temperature of air inducted into the engine.

6. The method of claim 1, wherein the crankcase volume V is derived as a function of the engine cycle position.

7. The method of claim 1, wherein the crankcase pressure P is derived from a pressure sensor located within the crankcase of the engine.

8. In a crankcase scavenged two-stroke engine characterized by an operating cycle including portions during which air is inducted into a crankcase chamber, is thereafter trapped and compressed within the shrinking volume of the crankcase chamber, and is then transferred to and trapped in a combustion chamber; a method for determining the mass of air trapped in the combustion chamber during the engine cycle, comprising the steps of:

deriving indications of the pressure P, volume V, and temperature T, of air within the crankcase chamber during the engine operating cycle;

determining the mass of air $M_T$ trapped in the crankcase chamber from indicated values of pressure P, volume V, and temperature T derived during that portion of the operating cycle when air is trapped and compressed within the crankcase;

determining the residual mass of air $M_R$ remaining in the crankcase chamber from indicated values of pressure P, volume V, and temperature T derived during that portion of the operating cycle after the transfer of air to the combustion chamber is substantially completed;

estimating the mass of air M transferred to the combustion by chamber as a function of the difference between the mass of air $M_T$ trapped within the crankcase chamber and the mass of air $M_R$ remaining within the crankcase chamber;

determining a trapping efficiency value representing the percentage of the transferred mass of air M, which is trapped in the combustion chamber; and adjusting the transferred mass of air M in accord with the determined trapping efficiency value to provide a measure of the air mass trapped in the combustion chamber.

9. The method in claim 8, wherein the mass of air $M_T$ trapped in the crankcase is determined in accordance with the Ideal Gas Law, such that $M_T = PV/RT$, where R is the gas constant for air.

10. The method in claim 8, wherein the mass of air $M_R$ remaining in the crankcase is determined in accordance with the Ideal Gas Law, such that $M_R = PV/RT$, where R is the gas constant for air.

11. The method in claim 8, wherein the mass of air M transferred to the combustion chamber is determined in accordance with the expression $M = \alpha + \beta(M_T - M_R)$, where $\alpha$ and $\beta$ are predetermined constants.

12. The method in claim 8, wherein the crankcase air temperature T is derived as a function of the temperature of air inducted into the engine.

13. The method of claim 8, wherein the crankcase volume V is derived as a function of the engine cycle position.

14. The method of claim 8, wherein the crankcase pressure P is derived from a pressure sensor located within the crankcase of the engine.

* * * * *